US010768145B2

(12) United States Patent
Kobayashi

(10) Patent No.: US 10,768,145 B2
(45) Date of Patent: Sep. 8, 2020

(54) MEASUREMENT APPARATUS, ATTENUATION CHARACTERISTIC CALCULATION METHOD, PROGRAM, AND MEASUREMENT SYSTEM

(71) Applicant: Seiko Epson Corporation, Tokyo (JP)

(72) Inventor: Yoshihiro Kobayashi, Komagane (JP)

(73) Assignee: Seiko Epson Corporation (JP)

( * ) Notice: Subject to any disclaimer, the term of this patent is extended or adjusted under 35 U.S.C. 154(b) by 245 days.

(21) Appl. No.: 15/381,547

(22) Filed: Dec. 16, 2016

(65) Prior Publication Data
US 2017/0184550 A1 Jun. 29, 2017

(30) Foreign Application Priority Data
Dec. 28, 2015 (JP) .................. 2015-256335

(51) Int. Cl.
*G01N 29/11* (2006.01)
*G01N 29/44* (2006.01)
*G01P 3/64* (2006.01)
*G01P 3/02* (2006.01)

(52) U.S. Cl.
CPC ............. *G01N 29/11* (2013.01); *G01N 29/44* (2013.01); *G01P 3/02* (2013.01); *G01P 3/64* (2013.01); *G01N 2291/015* (2013.01); *G01N 2291/0289* (2013.01)

(58) Field of Classification Search
CPC .. G01N 29/11; G01N 29/44; G01N 2291/015; G01N 2291/0289; G01P 3/02; G01P 3/64
See application file for complete search history.

(56) References Cited

U.S. PATENT DOCUMENTS

| | | | | |
|---|---|---|---|---|
| 9,772,237 B1* | 9/2017 | Bednarz | ................ | G01L 1/2206 |
| 10,139,308 B2* | 11/2018 | Kobayashi | .......... | G01M 5/0008 |
| 2002/0092359 A1* | 7/2002 | Lange | .................... | B82Y 35/00 73/779 |
| 2008/0087083 A1* | 4/2008 | Nishizawa | ............ | G01P 15/097 73/514.29 |
| 2011/0174075 A1* | 7/2011 | Watanabe | ............. | G01P 15/097 73/514.34 |
| 2012/0067124 A1* | 3/2012 | Zolfagharkhani | . | G01C 19/5733 73/579 |
| 2012/0173171 A1* | 7/2012 | Bajwa | .................... | G01H 11/06 702/56 |
| 2012/0227274 A1* | 9/2012 | Watanabe | ................ | G01C 9/06 33/365 |

(Continued)

FOREIGN PATENT DOCUMENTS

| | | |
|---|---|---|
| JP | 2005-030786 A | 2/2005 |
| JP | 2017-120209 A | 7/2017 |

*Primary Examiner* — Stephanie E Bloss
(74) *Attorney, Agent, or Firm* — Harness, Dickey & Pierce, P.L.C.

(57) ABSTRACT

A conversion section converts a change in signal information outputted from a vibration detector provided on a structural body from the change in the function of time into the change in the function of the distance between a moving object that moves on the structural body and the vibration detector. An attenuation characteristic calculation section calculates an attenuation characteristic of the structural body based on the signal information so converted as to represent the change in the function of the distance.

10 Claims, 10 Drawing Sheets

(56) References Cited

U.S. PATENT DOCUMENTS

| | | | |
|---|---|---|---|
| 2012/0304769 A1* | 12/2012 | Watanabe | G01P 15/0802 73/514.01 |
| 2013/0104677 A1* | 5/2013 | Watanabe | G01C 9/06 73/865.8 |
| 2013/0112019 A1* | 5/2013 | Watanabe | G01P 15/097 73/865.8 |
| 2013/0167669 A1* | 7/2013 | Watanabe | G01P 15/09 73/865 |
| 2017/0184471 A1 | 6/2017 | Kobayashi | |

* cited by examiner

MEASUREMENT APPARATUS, ATTENUATION CHARACTERISTIC CALCULATION METHOD, PROGRAM, AND MEASUREMENT SYSTEM

BACKGROUND

1. Technical Field

The present invention relates to a measurement apparatus, an attenuation characteristic calculation method, a program, and a measurement system.

2. Related Art

JP-A-2005-30786 describes a method for measuring the weight of a vehicle that passes along a bridge, and the method includes installing a plurality of speed detection sensors along a travel path to detect the travel speed of the passing vehicle, installing an axel detection sensor on the travel path to detect the axel position and the number of axels of the passing vehicle and performing vehicle recognition of the passing vehicle on the basis of the travel speed and the axle position, and installing a deformation quantity measurement device on the bridge to measure the quantity of deformation of the bridge multiple times within a set measurement period at least in correspondence with the axels of the passing vehicle recognized as a vehicle and calculating the weight of the passing vehicle on the basis of vehicle recognition data and measured data on the deformation quantity corresponding to the axels.

Determination of an attenuation characteristic of a floor slab, such as an attenuation coefficient thereof, is important from the viewpoint of examination of the state of the floor slab. To this end, it is desired to readily acquire the attenuation characteristic of the floor slab.

JP-A-2005-30786 discloses a method for measuring the weight of a vehicle that passes along a bridge but does not disclose calculation of the attenuation characteristic of a structural body.

SUMMARY

An advantage of some aspects of the invention is to readily obtain the attenuation characteristic of a structural body.

A first aspect of the invention is directed to a measurement apparatus including a conversion section that converts a change in signal information outputted from a vibration detector provided on a structural body from the change in the function of time into the change in the function of a distance between a moving object that moves on the structural body and the vibration detector and an attenuation characteristic calculation section that calculates an attenuation characteristic of the structural body based on the signal information so converted as to represent the change in the function of the distance. According to the first aspect, the attenuation characteristic of the structural body can be readily obtained.

The measurement apparatus may further include a speed calculation section that calculates a speed of the moving object that moves on the structural body, and the conversion section may convert a change in the signal information outputted from the vibration detector from the change in the function of time into the change in the function of the distance by using the speed of the moving object. A temporal change in the signal information from the vibration detector can therefore be converted from the change in the function of time into the change in the function of the distance, whereby the attenuation characteristic of the structural body can be readily obtained.

The vibration detector may be provided on a side end portion of the structural body, which extends along a restriction direction of a movement direction restrictor that restricts a movement direction of the moving object, and in a central portion of the side end portion in a direction along the restriction direction. An appropriate attenuation characteristic of the structural body can therefore be readily obtained.

The signal information may be information on vertical acceleration or width-direction acceleration of a surface of the structural body on which the moving objects travels. An appropriate attenuation characteristic of the structural body can therefore be readily obtained.

The conversion section may convert the signal information having a predetermined frequency component other than a frequency component due to natural resonance of the structural body and a frequency component due to bending of the structural body resulting from a load of the moving object into the change in the function of the distance. An appropriate attenuation characteristic of the structural body can therefore be readily obtained.

The attenuation characteristic calculation section may calculate the attenuation characteristic of the structural body based on information on a distance-dependent waveform of the signal information and information on a waveform that is expressed by an attenuation model of the structural body and attenuates with a distance. An appropriate attenuation characteristic of the structural body can therefore be calculated.

The measurement apparatus may further include an estimation section that estimates occurrence of abnormality of the structural body based on the attenuation characteristic. Whether or not abnormality of the structural body has occurred can therefore be checked.

The measurement apparatus may further include an output section that outputs the occurrence of abnormality. Estimated occurrence of abnormality of the structural body can therefore be informed.

The conversion section may extract the signal information produced when the moving object moves on the structural body based on entrance and exit of the moving object into and out of the structural body detected by a detector and converts the signal information into the change in the function of the distance. An appropriate attenuation characteristic of the structural body can therefore be readily calculated.

A second aspect of the invention is directed to an attenuation characteristic calculation method including converting a change in signal information outputted from a vibration detector provided on a structural body from the change in the function of time into the change in the function of a distance between a moving object that moves on the structural body and the vibration detector and calculating an attenuation characteristic of the structural body based on the signal information so converted as to represent the change in the function of the distance. According to the second aspect, the attenuation characteristic of the structural body can be readily obtained.

A third aspect of the invention is directed to a program that causes a computer to perform converting a change in signal information outputted from a vibration detector provided on a structural body from the change in the function of time into the change in the function of a distance between a moving object that moves on the structural body and the vibration detector and calculating an attenuation characteristic of the structural body based on the signal information so converted as to represent the change in the function of the distance. According to the third aspect, the attenuation characteristic of the structural body can be readily obtained.

A fourth aspect of the invention is directed to a measurement system including a vibration detector provided on a structural body and a measurement apparatus including a conversion section that converts a change in signal information outputted from the vibration detector from the change in the function of time into the change in the function of a distance between a moving object that moves on the structural body and the vibration detector and an attenuation characteristic calculation section that calculates an attenuation characteristic of the structural body based on the signal information so converted as to represent the change in the function of the distance. According to the fourth aspect, the attenuation characteristic of the structural body can be readily obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings.

Figure 1:
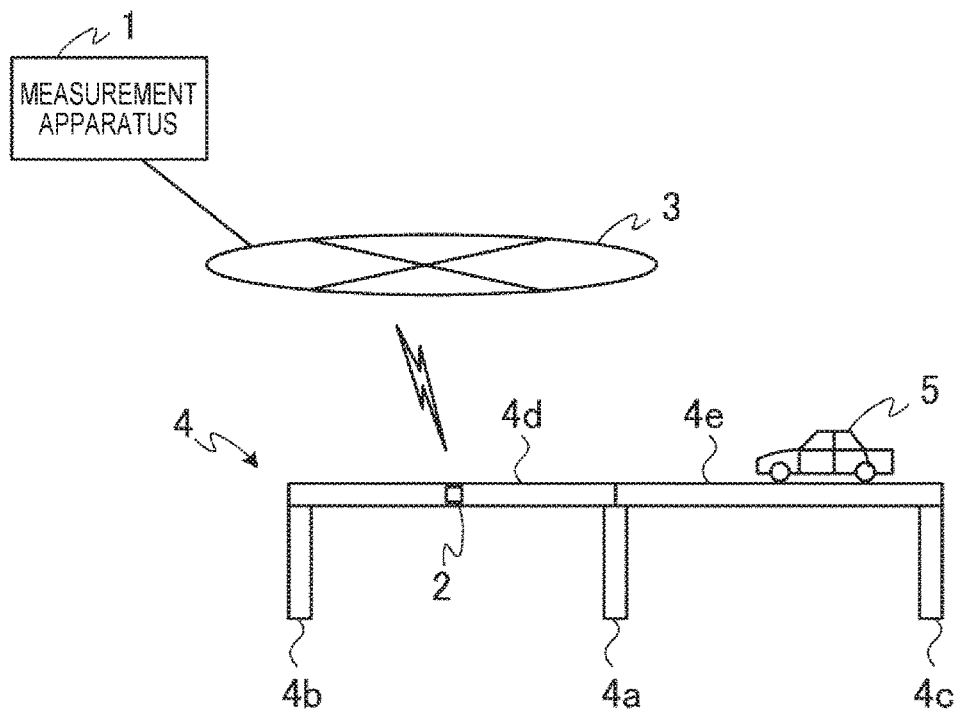
FIG. 1 shows an example of the configuration of a measurement system according to an embodiment of the invention.

FIG. 1 shows an example of the configuration of a measurement system according to the embodiment of the invention. The measurement system includes a measurement apparatus 1 and an acceleration sensor 2 (corresponding to the vibration detector according to an aspect of the invention), as shown in FIG. 1. FIG. 1 further shows a bridge 4.

The bridge 4 includes a bridge pier 4a, which is located in a roughly central portion of the bridge 4, two abutments 4b and 4c, which are located at opposite ends of the bridge 4, a floor slab 4d (corresponding to the structural body according to an aspect of the invention), which is laid on the abutment 4b and the bridge pier 4a and from the abutment 4b to the bridge pier 4a, and a floor slab 4e, which is laid on the abutment 4c and the bridge pier 4a and from the abutment 4c to the bridge pier 4a. The bridge pier 4a and the abutments 4b and 4c are fixed onto foundations (not shown) built in the ground.

The acceleration sensor 2 is installed on a side surface of the floor slab 4d. The acceleration sensor 2 periodically measures acceleration of the floor slab 4d that occurs, for example, when a vehicle 5 (corresponding to the moving object according to an aspect of the invention) travels (moves) on the floor slab 4d and outputs data on the acceleration. The acceleration data outputted by the acceleration sensor 2 is, for example, a digital signal. The measurement apparatus 1 and the acceleration sensor 2 are communicably connected to each other over a communication network 3, and the acceleration sensor 2 transmits measured acceleration data to the measurement apparatus 1 over the communication network 3. The acceleration sensor 2 may instead be an inertia sensor that outputs acceleration and angular velocity. In the following description, the acceleration data outputted from the acceleration sensor 2 is simply called acceleration in some cases.

The acceleration sensor 2 is provided with or connected to, for example, a wireless communication interface and is connected to the communication network 3 via the wireless communication interface.

When the vehicle 5 travels on the floor slab 4d, it can be said that the vehicle 5 travels with the wheels hitting (applying impact to) the floor slab 4d. The acceleration sensor 2 detects acceleration (vibrational acceleration) of the floor slab 4d that occurs due to the impact applied by the vehicle 5, and the measurement apparatus 1 uses the impact-based acceleration detected with the acceleration sensor 2 to calculate an attenuation coefficient (corresponding to the attenuation characteristic according to an aspect of the invention) of the floor slab 4d. The attenuation coefficient of the floor slab 4d can thus be readily obtained. For example, no special apparatus, person, or other object needs to apply impact to the floor slab 4d, but the impact produced by the passage of the vehicle 5 can be used to readily obtain the attenuation coefficient of the floor slab 4d.

Figure 2:
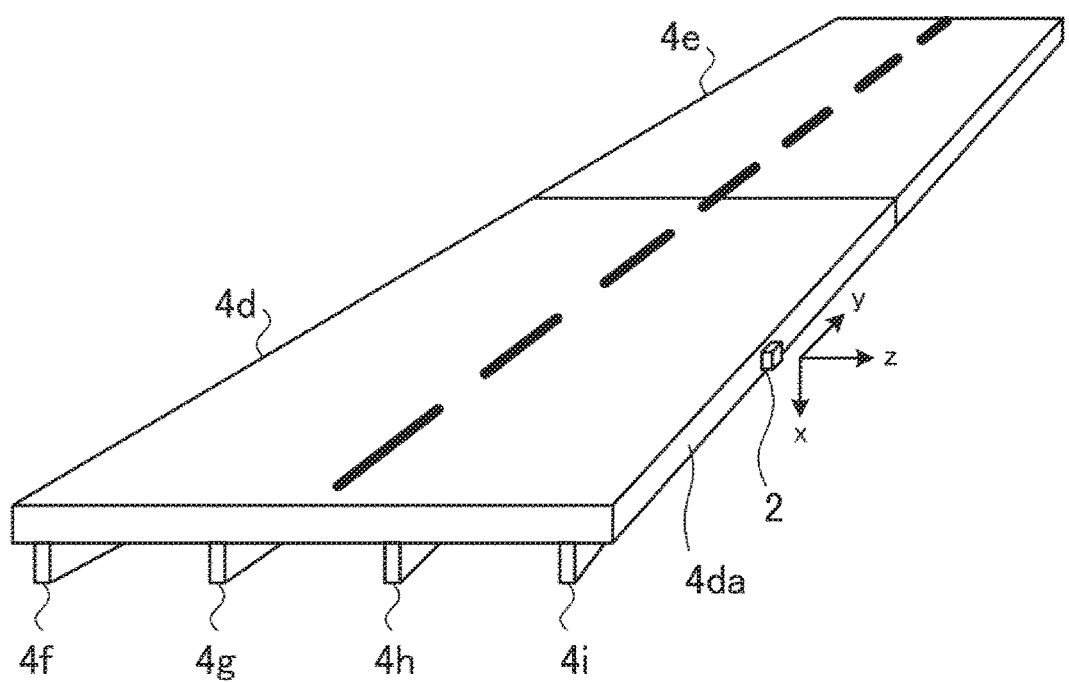
FIG. 2 describes an example of a method for installing an acceleration sensor.

FIG. 2 describes an example of a method for installing the acceleration sensor 2. FIG. 2 is a perspective view of the floor slabs 4d and 4e shown in FIG. 1.

FIG. 2 shows main girders 4f to 4i (not shown in FIG. 1). The main girders 4f to 4i are laid on the bridge pier 4a and the abutments 4b and 4c, and the floor slabs 4d and 4e are installed on the main girders 4f to 4i. In the following description, it is assumed that the road surface of the floor slab 4d is a horizontal surface, and that the direction perpendicular to the road surface coincides with the vertical direction for ease of description.

The acceleration sensor 2 is provided on a side end portion of the bridge 4, which extends along a restriction direction of a movement direction restrictor that restricts the movement direction of the vehicle 5, and in a central portion of the side end portion in the direction along the restriction direction. For example, the acceleration sensor 2 is attached to a side surface 4da (corresponding to the end portion according to an aspect of the invention), which is parallel (including roughly parallel) to the restriction direction of the movement direction restrictor (traffic lane, curbstone, and handrail, for example), with which the floor slab 4d is provided and which restricts the movement direction of the vehicle 5, and in a central portion (including roughly central portion) of the side surface 4da in the restriction direction. The acceleration sensor 2 can measure acceleration that occurs in the axial direction of each of three axes perpendicular to each other. The acceleration sensor 2 is so installed on the side surface 4da of the bridge pier 4d, for example, that one (x axis, for example) of the three detection axes (x axis, y axis, and z axis) coincides with the direction perpendicular to the road surface of the bridge pier 4d and that another axis (z axis, for example) coincides with the width direction of the road surface of the bridge pier 4d. The acceleration sensor 2 senses acceleration in the three axes, for example, at a set sampling frequency and transmits the sensed acceleration to the measurement apparatus 1 over the communication network 3. Acceleration in each of the y axis and the z axis corresponds to a gravity component resulting from inclination of the floor slab 4b.

Figure 3:
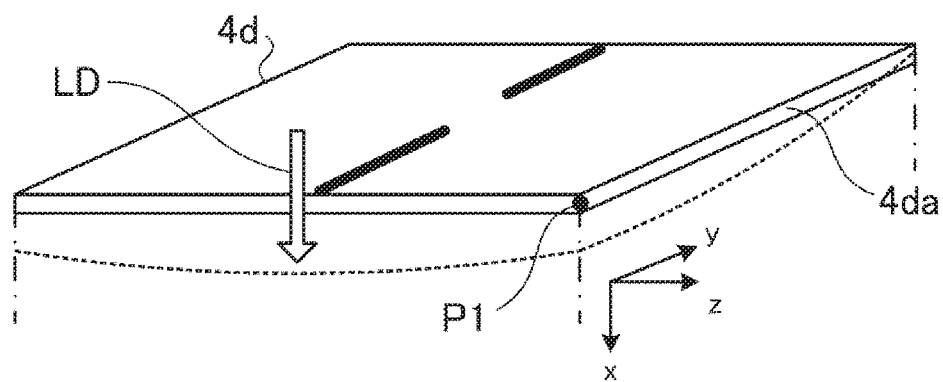
FIG. 3 describes an example of how a floor slab is deformed.

FIG. 3 describes an example of how the floor slab 4d is deformed. FIG. 3 is a perspective view of the floor slab 4d in FIG. 2 taken along the line passing through the acceleration sensor 2.

When the vehicle 5 travels on the floor slab 4d, the floor slab 4d is so deformed as to bend downward due to the load LD of the vehicle 5, as shown in FIG. 3. Since a position P1 where the acceleration sensor 2 is attached is the center of the side surface 4da of the floor slab 4d along the restriction direction and is therefore farthest from the bridge pier 4a and the abutment 4b, a change in the vertical position (position on x axis) of the floor slab 4d tends to be greater than the changes in the other positions. Further, since the position P1, where the acceleration sensor 2 is attached, is located on the side surface 4da of the floor slab 4d, inclination of the floor slab 4d (inclination of z axis) with respect to the horizontal direction tends to be greater than the inclination in the other positions. The acceleration sensor 2, which is attached to the attachment position P1 on the floor slab 4d, can therefore distinctly detect the acceleration in the direction perpendicular to the floor slab 4d and the acceleration in the width direction of the floor slab 4d that occur due to the load LD of the vehicle 5.

Figure 4:
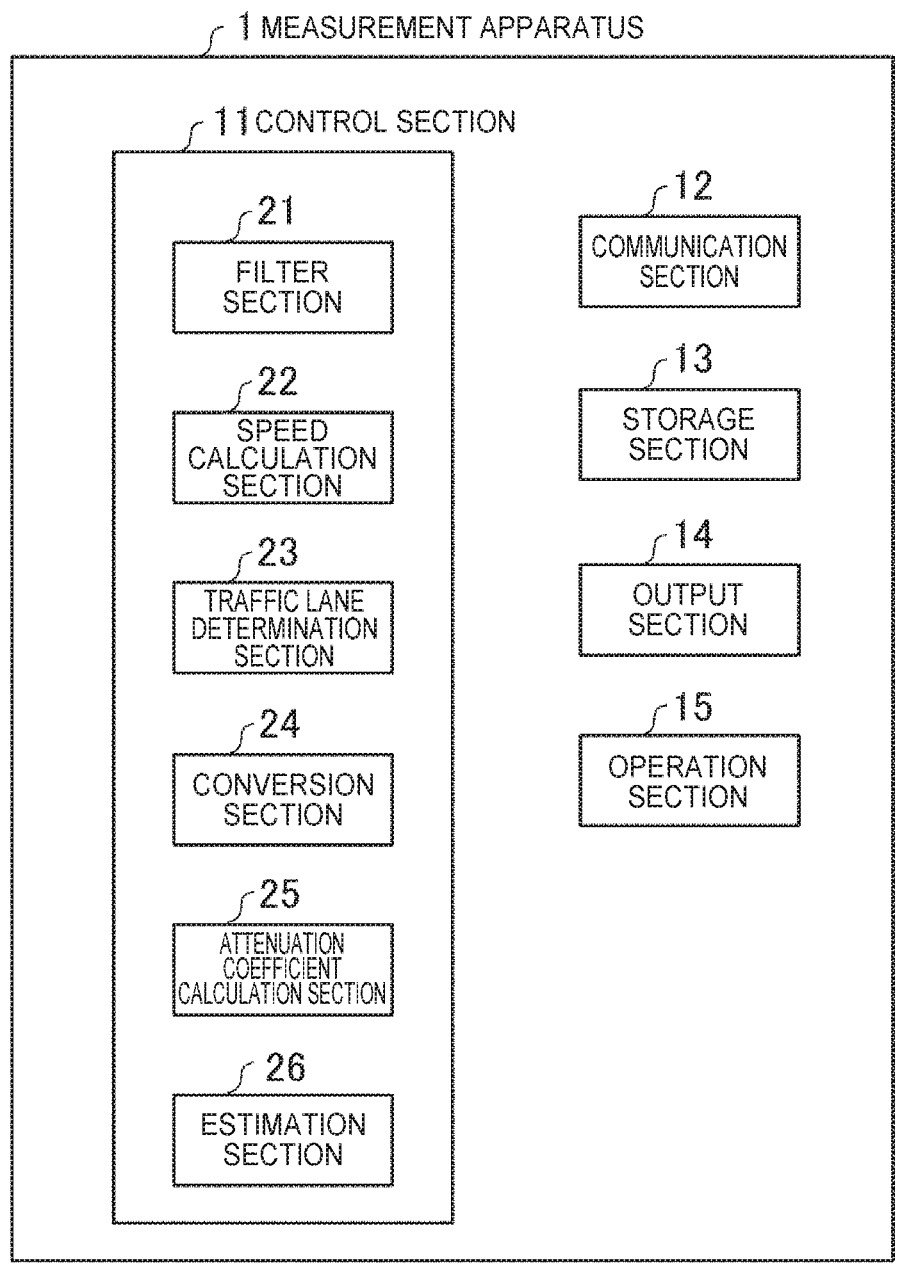
FIG. 4 shows an example of the configuration of functional blocks of a measurement apparatus.

FIG. 4 shows an example of the configuration of functional blocks of the measurement apparatus 1. The measurement apparatus 1 includes a control section 11, a communication section 12, a storage section 13, an output section 14, and an operation section 15, as shown in FIG. 4.

The control section 11 calculates the attenuation coefficient of the floor slab 4d, and the calculation will be described below in detail.

The communication section 12 receives the acceleration from the acceleration sensor 2 over the communication network 3. The communication section 12 stores the acceleration received from the acceleration sensor 2 in the storage section 13.

The storage section 13 stores programs, data, and other pieces of information used by the control section 11 to carry out calculation and control processes. The storage section 13 further stores programs, data, and other pieces of information used by the control section 11 to achieve predetermined application functions. The variety of programs, data, and other pieces of information may be stored in advance in a nonvolatile recording medium or may be received from a server over the communication network 3 and stored in the storage section 13. The storage section 13 is formed, for example, of a ROM (read only memory), a flash ROM, a RAM (random access memory), or any of a variety of other IC (integrated circuit) memories, and a hard disk drive, a memory card, or any other recording media.

The storage section 13 further stores the acceleration transmitted from the acceleration sensor 2 and received by the communication section 12.

The storage section 13 further stores in advance the relationship representing the distance between the vehicle 5 that travels on the floor slab 4d and the acceleration sensor 2 provided on the floor slab 4d.

Figure 5:
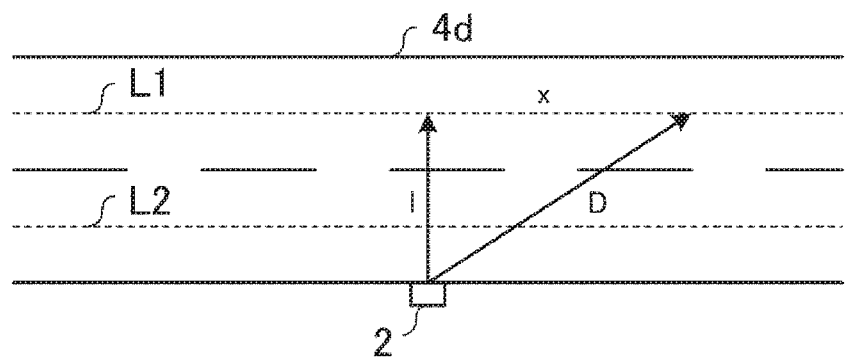
FIG. 5 is a first diagram for describing an example of the relationship representing the distance between a vehicle that travels on a floor slab and the acceleration sensor.

FIG. 5 is a first diagram for describing an example of the relationship representing the distance between the vehicle 5 that travels on the floor slab 4d and the acceleration sensor 2. FIG. 5 shows the floor slab 4d and the acceleration sensor 2. A travel line L1 shown in FIG. 5 represents the travel trajectory of the vehicle 5 that travels along a traffic lane far away from the acceleration sensor 2. A travel line L2 represents the travel trajectory of the vehicle 5 that travels along a traffic lane close to the acceleration sensor 2.

The distance "D" between the vehicle 5 that travels along the traffic lane far away from the acceleration sensor 2 and the acceleration sensor 2 is determined. Let "l" be the length of a perpendicular extending from the acceleration sensor 2 to the travel line L1, as shown in FIG. 5. Further, let "x" be the position of the vehicle 5 on the travel line L1 (distance between the foot of the perpendicular described above and the vehicle 5). In this case, the distance "D" is determined by using the following Expression (1):

$$D(x) = \sqrt{x^2 + l^2} \quad (1)$$

The distance between the vehicle 5 that travels along the traffic lane close to the acceleration sensor 2 and the acceleration sensor 2 is also determined by using Expression (1) by substituting a different value into "l" in Expression (1).

Figure 6:
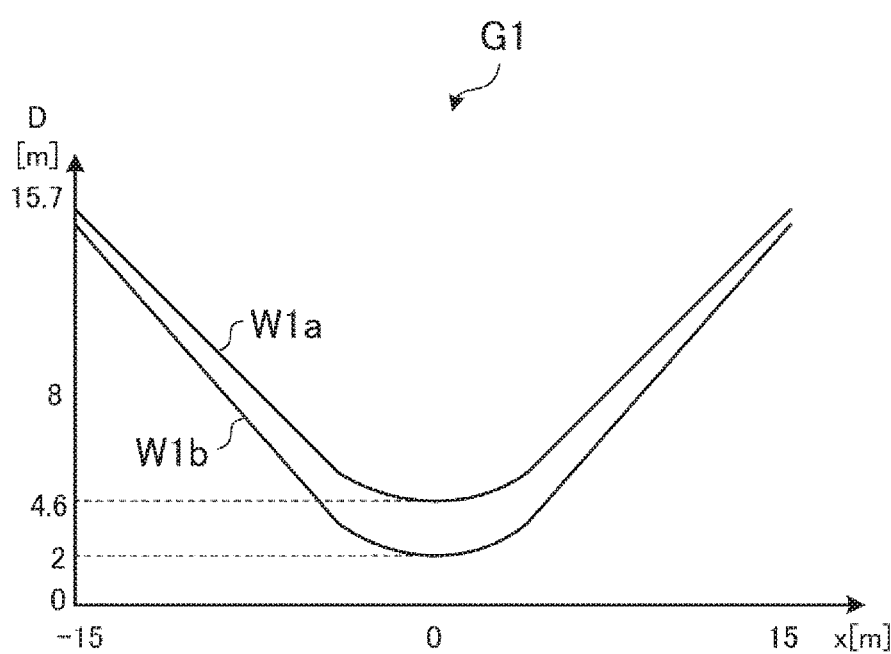
FIG. 6 is a second diagram for describing an example of the relationship representing the distance between a vehicle that travels on the floor slab and the acceleration sensor.

FIG. 6 is a second diagram for describing an example of the relationship representing the distance between the vehicle 5 that travels on the floor slab 4d and the acceleration sensor 2. The horizontal axis of FIG. 6, which shows graphs G1, represents the position "x" of the vehicle 5 on the travel lines L1 and L2. The vertical axis of FIG. 6 represents the distance "D" between the vehicle 5 and the acceleration sensor 2.

The waveform W1a of the graphs G1 shows the relationship representing the distance determined by Expression (1) between the vehicle 5 that travels along the traffic lane far away from the acceleration sensor 2 (travel line L1) and the acceleration sensor 2. The waveform W1b of the graphs G1 shows the relationship representing the distance determined by Expression (1) between the vehicle 5 that travels along the traffic lane close to the acceleration sensor 2 (travel line L2) and the acceleration sensor 2.

The graphs G1 are obtained by assuming that the length of the floor slab 4d is "30 m," and that the position of the acceleration sensor 2 is "x=0." The waveform W1a shows the relationship representing the distance between the vehicle 5 at "l=4.6 m" and the acceleration sensor 2, and the waveform W1b shows the relationship representing the distance between the vehicle 5 at "l=2 m" and the acceleration sensor 2.

The storage section 13 stores the relationship representing the distance between the vehicle 5 that travels along the traffic lane far away from the acceleration sensor 2 (travel line L1) and the acceleration sensor 2 provided on the floor slab 4d. For example, the storage section 13 stores information representing the relationship between "x" and "D" indicated by the waveform W1a.

The storage section 13 further stores the relationship representing the distance between the vehicle 5 that travels along the traffic lane close to the acceleration sensor 2 (travel line L2) and the acceleration sensor 2 provided on the floor slab 4d. For example, the storage section 13 stores information representing the relationship between "x" and "D" indicated by the waveform W1b.

The description of FIG. 4 resumes. The output section 14 outputs results of control performed by the control section 11 and other piece of information on a display apparatus. The operation section 15 acquires operation data from a user and transmits the operation data to the control section 11.

The control section 11 will be described. The control section 11 includes a filter section 21, a speed calculation section 22, a traffic lane determination section 23, a conversion section 24, an attenuation coefficient calculation section (corresponding to the attenuation characteristic calculation section according to an aspect of the invention) 25, and an estimation section 26. The functions of the constituent sections of the control section 11 are achieved, for example, by a CPU (central processing unit) that executes the programs stored in the storage section 13. The functions of the constituent sections of the control section 11 may instead be achieved by an ASIC (application specific integrated circuit) or any other custom IC (integrated circuit), or the functions may be achieved by the combination of the CPU and the ASIC.

The filter section 21 acquires acceleration transmitted from the acceleration sensor 2 and stored in the storage section 13. The filter section 21 filters the acquired acceleration.

Figure 7:
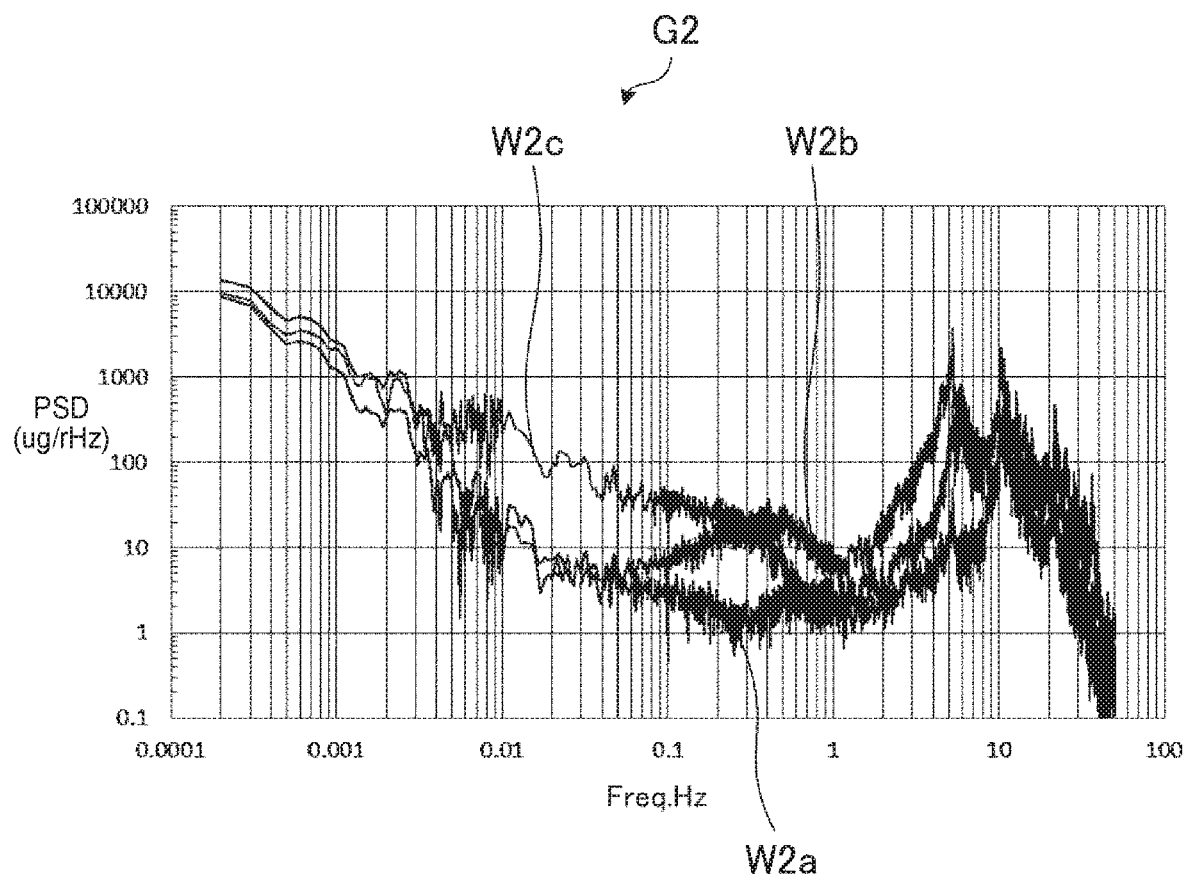
FIG. 7 shows an example of an acceleration frequency characteristic obtained when the vehicle travels on the floor slab.

FIG. 7 shows an example of an acceleration frequency characteristic obtained when the vehicle 5 travels on the floor slab 4d. The horizontal axis of FIG. 7, which shows graphs G2, represents the frequency, and the vertical axis of FIG. 7 represents power spectrum density. The length of the floor slab 4d used to measure the acceleration frequency characteristic is "30 m."

The waveform W2a shown by the graphs G2 represents the frequency characteristic of the acceleration in the x-axis direction from the acceleration sensor 2. The waveform W2b represents the frequency characteristic of the acceleration in the y-axis direction from the acceleration sensor 2. The waveform W2c represents the frequency characteristic of the acceleration in the z-axis direction from the acceleration sensor 2.

The acceleration in each of the axes has a peak at a frequency around "10 Hz," as indicated by the graphs G2. The peaks at frequencies around "10 Hz" are believed to be those resulting from the natural resonance of the floor slab 4d.

The acceleration at frequencies ranging from "0.1 to 1 Hz" indicated by the graphs G2 results from bending of the floor slab 4d that occurs due to the load of the vehicle 5.

The frequency components lower than "0.1 Hz" are believed to be those resulting from a long-term change in and ambient vibration of the floor slab 4d due to an environmental change, such as a temperature change, noise produced by the sensor, and other factors.

The speed calculation section 22, which will be described below, calculates the speed of the vehicle 5 on the floor slab 4d on the basis of vertical acceleration (acceleration in x-axis direction) due to bending of the floor slab 4d resulting from the load of the vehicle 5. The traffic lane determination section 23 determines the traffic lane which is provided on the floor slab 4d and along which the vehicle 5 travels on the basis of the width-direction acceleration (acceleration in z-axis direction) due to bending of the floor slab 4d resulting from the load of the vehicle 5. Acceleration frequency components required by the speed calculation section 22 and the traffic lane determination section 23 are therefore acceleration frequency components due to bending of the floor slab 4d resulting from the load of the vehicle 5, and the frequency component of the natural resonance acceleration of the floor slab 4d is not required (noise). The filter section 21 therefore suppresses the acceleration frequency component due to the natural resonance of the floor slab 4d but transmits the acceleration frequency components due to bending of the floor slab 4d resulting from the load of the vehicle 5.

For example, the filter section 21 uses an LPF (low pass filter) having a cutoff frequency of "1 Hz" to transmit acceleration containing the frequencies ranging from "0.1 to 1 Hz." The filter section 21 then outputs the transmitted acceleration containing the frequencies ranging from "0.1 to 1 Hz" to the speed calculation section 22 and the traffic lane determination section 23.

The conversion section 24, which will be described below, converts the vertical acceleration in the form of a temporal-axis signal due to the impact from the vehicle 5 on the floor slab 4d into acceleration in the form of a distance-axis signal. The attenuation coefficient calculation section 25 calculates the attenuation coefficient of the floor slab 4d on the basis of the vertical acceleration converted by the conversion section 24. The frequency component of the vertical acceleration necessary for the calculation of the attenuation coefficient of the floor slab 4d is vertical acceleration having suppressed frequency components other than the frequency component due to the impact, and the acceleration frequency component due to the bending of the floor slab 4d resulting from the load of the vehicle 5 and the acceleration frequency component due to the natural resonance of the floor slab 4d are unnecessary (noise). Further, ambient vibration, acoustic noise (in a case where large sound is produced in the vicinity of the bridge), and a natural frequency component due to the shape of the tread of the wheels are also unnecessary (noise). The filter section 21 therefore suppresses acceleration frequency components other than that due to the impact and output the frequency components due to the impact to the conversion section 24.

For example, the filter section 21 transmits frequencies in a narrow band from a frequency higher than the frequency of the acceleration duet to the natural resonance of the floor slab 4d (15 Hz, for example) to several kHz. Specifically, the filter section 21 uses a BPF (band pass filter) to transmit acceleration having a center frequency of "40 Hz" and a pass-band width of "2 Hz." The filter section 21 then outputs the transmitted acceleration having a center frequency of "40 Hz" and a pass-band width of "2 Hz" to the conversion section 24. For example, in a frequency region higher than the frequency of the acceleration due to the natural resonance of the floor slab 4d, the filter section 21 selects a center frequency in a frequency region that is not affected by the natural frequency described above that is unnecessary noise and further selects a pass-band width in view of an effect of the noise as required. In a case where the signal that passes the filter section 21 has sufficient magnitude, a narrow bandwidth is selected.

In the following description, the vertical acceleration having suppressed frequency components other than the frequency component due to the impact is called "impact-based vertical acceleration" in some cases.

The description of FIG. 4 resumes. The speed calculation section 22 receives, as an input, the vertical acceleration outputted from the filter section 21 and having a suppressed frequency component of the acceleration due to the natural resonance of the floor slab 4*d*. The speed calculation section 22 calculates vertical displacement (displacement in x-axis direction) of the floor slab 4*d* on the basis of the inputted vertical acceleration. For example, the speed calculation section 22 integrates the vertical acceleration twice to calculate the vertical displacement of the floor slab 4*d*. The speed calculation section 22 then calculates the speed of the vehicle 5 that travels on the floor slab 4*d* on the basis of the calculated vertical displacement.

Figure 8:
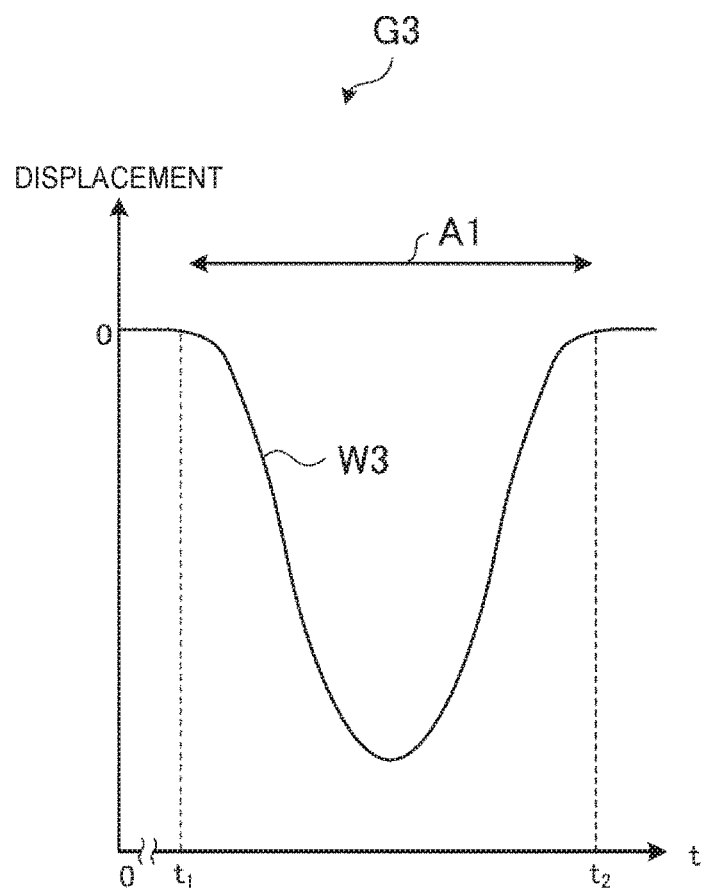
FIG. 8 describes an example of calculation of the speed of the vehicle.

FIG. 8 describes an example of the calculation of the speed of the vehicle 5. The horizontal axis of FIG. 8, which shows a graph G3, represents time, and the vertical axis of FIG. 8 represents the vertical displacement of the floor slab 4*d*. The waveform W3 of the graph G3 shows the vertical displacement of the floor slab 4*d* that occurs when the vehicle 5 travels on the floor slab 4*d*.

When the vehicle 5 enters the floor slab 4*d* and travels toward the central portion (position where acceleration sensor 2 is attached) of the floor slab 4*d*, the absolute value of the vertical displacement of the floor slab 4*d* gradually increases due to the load of the vehicle 5. When the vehicle 5 passes by the central portion of the floor slab 4*d*, the absolute value of the vertical displacement of the floor slab 4*d* is maximized. When the vehicle 5 moves away from the central portion, the absolute value of the vertical displacement of the floor slab 4*d* gradually decreases.

The speed calculation section 22 can therefore estimate the passage period for which the vehicle 5 passes along the floor slab 4*d* on the basis of the width of the wave representing the vertical displacement indicated by the arrow A1. For example, the speed calculation section 22 can estimate the passage period of the vehicle 5 on the basis of the period from time $t_1$ when the vertical acceleration changes from "0" to a negative value and time $t_2$ when the vertical acceleration changes from a negative value to "0". Specifically, the speed calculation section 22 can estimate the passage period of the vehicle 5 on the basis of "$t_2-t_1$." The time $t_1$ is the time when the vehicle 5 enters the floor slab 4*d*, and the time $t_2$ is the time when the vehicle 5 exits out of the floor slab 4*d*.

Knowing the passage period of the vehicle 5 allows determination of the speed of the vehicle 5 that travels on the floor slab 4*d*. The speed calculation section 22 can calculate the speed of the vehicle 5 by dividing the passage period of the vehicle 5 by the length of the floor slab 4*d* (30 m, for example).

The description of FIG. 4 resumes. The traffic lane determination section 23 receives, as an input, the width-direction acceleration having a frequency component of the acceleration due to the natural resonance of the floor slab 4*d* and outputted from the filter section 21. The traffic lane determination section 23 determines the traffic lane along which the vehicle 5 travels on the floor slab 4*d* on the basis of the inputted width-direction acceleration.

Figure 9:
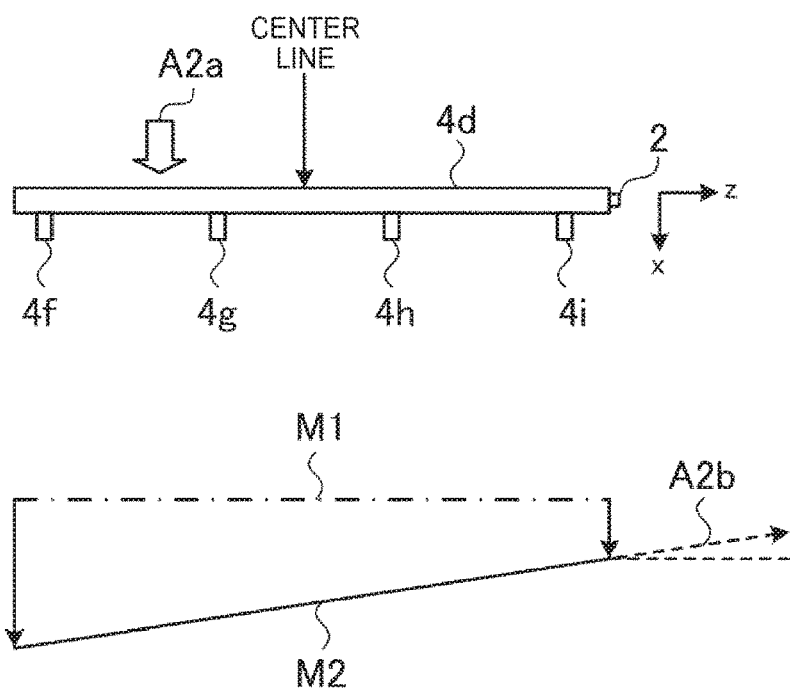
FIG. 9 is a first diagram for describing an example of determination of a traffic lane associated with the vehicle.

FIG. 9 is a first diagram for describing an example of the determination of the traffic lane associated with the vehicle 5. FIG. 9 is a cross-sectional view showing the floor slab 4*d* and the main girders 4*f* to 4*i* shown in FIG. 2. FIG. 9 further shows the acceleration sensor 2 attached to the floor slab 4*d*.

A model M1 drawn with the dashed line shown in FIG. 9 shows the position of the floor slab 4*d* in a case where the vehicle 5 does not travel on the floor slab 4*d*. A model M2 drawn with the solid line shows the position of the floor slab 4*d* in a case where the vehicle 5 travels along the traffic lane indicated by the arrow A2*a* (traffic lane far away from acceleration sensor 2) on the floor slab 4*d*.

When the vehicle 5 travels along the traffic lane indicated by the arrow A2*a* on the floor slab 4*d*, the end of the floor slab 4*d* on the right in FIG. 9 is inclines vertically upward to the left end of the floor slab 4*d* due to the load of the vehicle 5, as indicated by the model M2. The z axis of the acceleration sensor 2 attached to the floor slab 4*d* therefore inclines upward above the horizontal direction, as indicated by the dotted-line arrow A2*b*.

Figure 10:
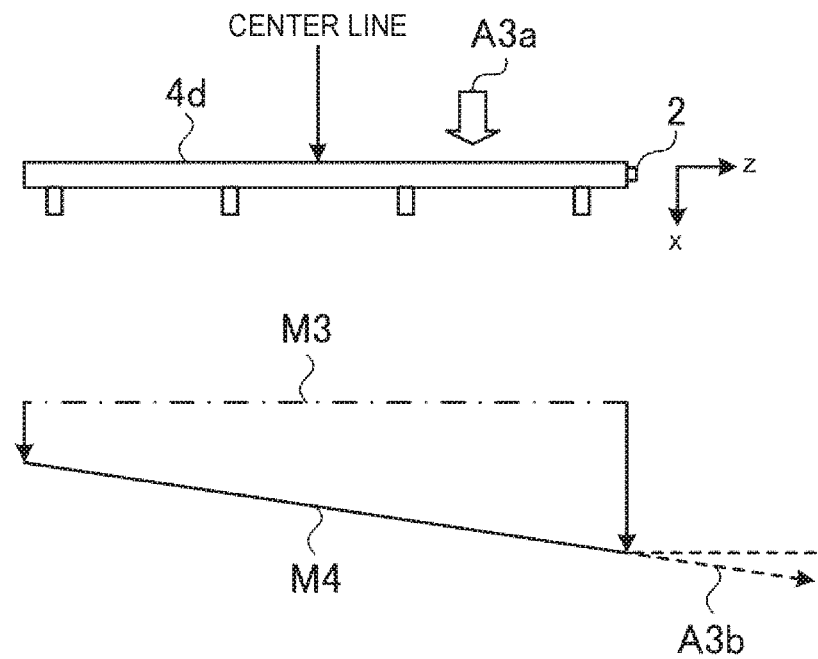
FIG. 10 is a second diagram for describing an example of the determination of the traffic lane associated with the vehicle.

FIG. 10 is a second diagram for describing an example of the determination of the traffic lane associated with the vehicle 5. In FIG. 10, the same components have the same reference characters as those in FIG. 9.

A model M3 drawn with the dashed line shown in FIG. 10 shows the position of the floor slab 4*d* in the case where the vehicle 5 does not travel on the floor slab 4*d*. A model M4 drawn with the solid line shows the position of the floor slab 4*d* in a case where the vehicle 5 travels along the traffic lane indicated by the arrow A3*a* (traffic lane close to acceleration sensor 2) on the floor slab 4*d*.

When the vehicle 5 travels along the traffic lane indicated by the arrow A3*a* on the floor slab 4*d*, the end of the floor slab 4*d* on the right in FIG. 9 is inclines vertically downward to the left end of the floor slab 4*d* due to the load of the vehicle 5, as indicated by the model M4. The z axis of the acceleration sensor 2 attached to the floor slab 4*d* therefore inclines downward below the horizontal direction, as indicated by the dotted-line arrow A3*b*.

The z axis of the acceleration sensor 2 inclines upward or downward with respect to the horizontal direction depending on the traffic lane along which the vehicle 5 travels, as indicated by the dotted-line arrow A2*b* in FIG. 9 and the dotted-line arrow A3*b* in FIG. 10. The traffic lane determination section 23 can therefore determine the traffic lane along which the vehicle 5 travels on the basis of the sign of the width-direction acceleration outputted from the acceleration sensor 2.

The description of FIG. 4 resumes. The conversion section 24 receives, as an input, the vertical acceleration produced by the impact from the vehicle 5 and outputted from the filter section 21. The conversion section 24 converts a change in the envelope of the inputted vertical acceleration from the change in the function of time into the change in the function of the distance between the vehicle 5 and the acceleration sensor 2.

Figure 11:
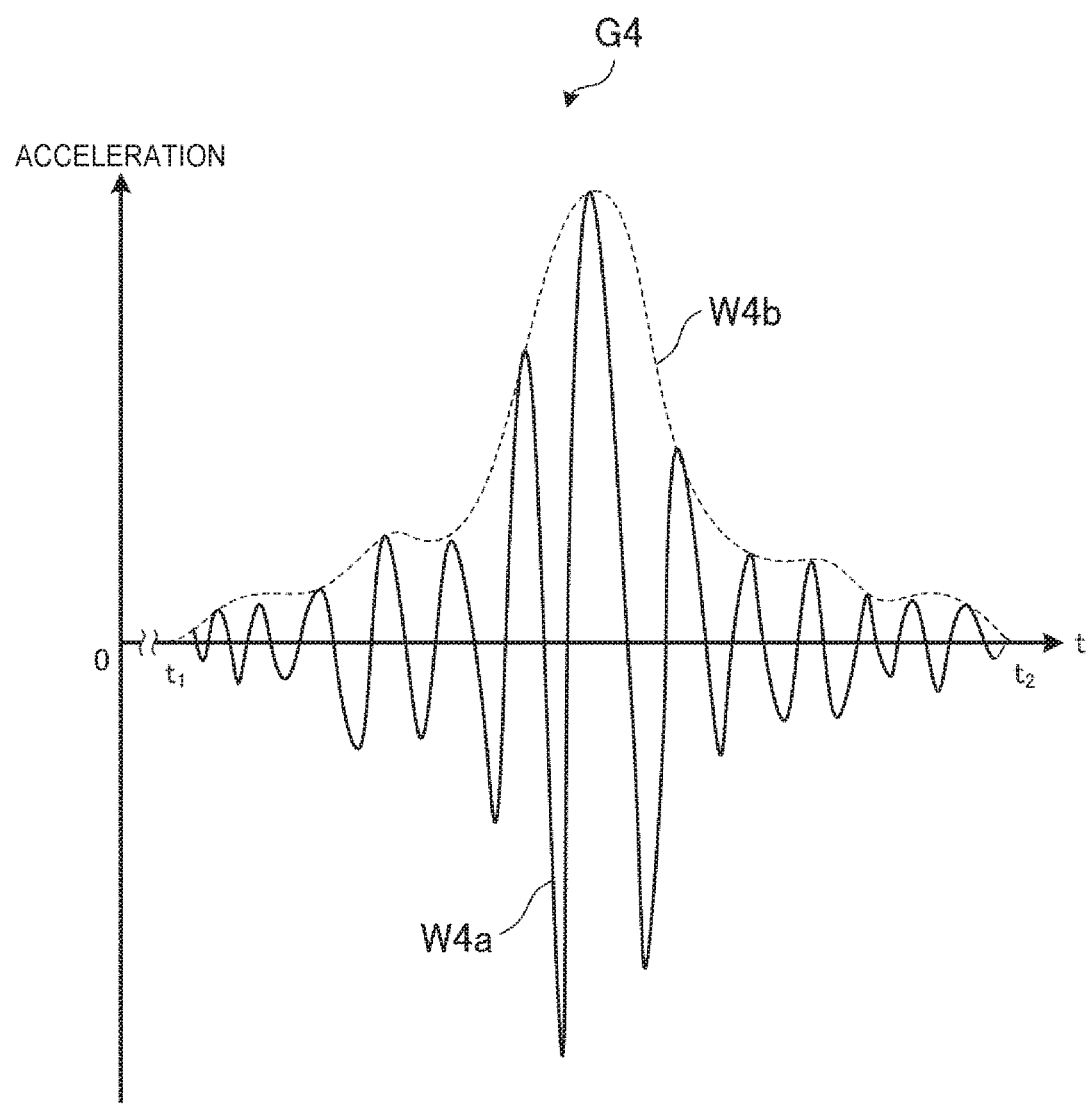
FIG. 11 describes an example of vertical acceleration inputted to a conversion section.

FIG. 11 describes an example of the vertical acceleration inputted to the conversion section 24. The horizontal axis of FIG. 11, which shows a graph G4, represents time, and the vertical axis represents the acceleration. The waveform W4*a* of the graph G4 shows the vertical acceleration produced by the impact from the vehicle 5 and inputted to the conversion section 24. The time $t_1$ shown in FIG. 11 is the time when the vehicle 5 enters the floor slab 4*d*, and the time $t_2$ is the time when the vehicle 5 exits out of the floor slab 4*d*.

The conversion section 24 calculates the envelope of the inputted vertical acceleration (waveform W4*a*). For example, the conversion section 24 calculates the absolute values of the inputted vertical acceleration and calculates an envelope formed of the calculated absolute values. The waveform W4*b* of the graph G4 shows the envelope of the inputted vertical acceleration.

The horizontal axis of FIG. 11, which shows the graph G4, is time. The waveform W4*a* therefore shows a change in the envelope of the vertical acceleration in the function of time. The conversion section 24 converts a change in the envelope of the vertical acceleration from the change in the function of time into the change in the function of the distance between the vehicle 5 and the acceleration sensor 2 stored in the storage section 13. For example, the conversion section 24 uses the speed of the vehicle 5 calculated by the speed calculation section 22 to convert a change in the envelope of the vertical acceleration from the change in the function of time into the change in the function of the distance between the vehicle 5 and the acceleration sensor 2 stored in the storage section 13.

More specifically, the speed of the vehicle 5 calculated by the speed calculation section 22 represents the travel of the vehicle 5 per unit time that travels along each of the traffic lanes L1 and L2 (see FIG. 5) on the floor slab 4*d*. Therefore, the position (x) of the vehicle 5 on each of the traffic lanes L1 and L2 with each passing moment is known, and the distance (D) between the vehicle 5 and the acceleration sensor 2 with each passing moment is known, the conversion section 24 can convert a change in the envelope of the vertical acceleration from the change in the function of time (each passing moment) into the change in the function of the distance between the vehicle 5 and the acceleration sensor 2.

The relationship representing the distance between the vehicle 5 and the acceleration sensor 2 varies depending on the traffic lane along which the vehicle 5 travels, as indicated by the waveforms w1*a* and W1*b* in FIG. 6. The conversion section 24 switches the relationship representing the distance between the vehicle 5 and the acceleration sensor 2 to be referred to and stored in the storage section 13 from one to the other on the basis of the traffic lane determined by the traffic lane determination section 23. For example, in a case where the traffic lane determination section 23 determines that the vehicle 5 travels along the traffic lane far away from the acceleration sensor 2, the conversion section 24 refers to the waveform W1*a* in FIG. 6 and converts a change in the envelope of the vertical acceleration from the change in the function of time into the change in the function of the distance between the vehicle 5 and the acceleration sensor 2.

Figure 12:
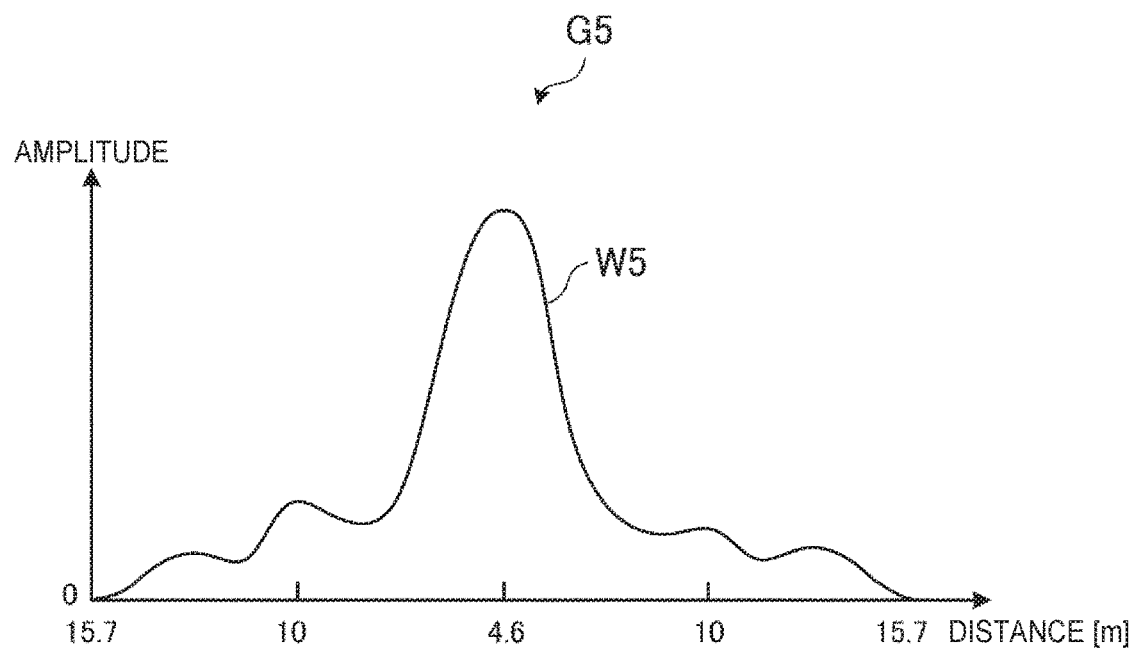
FIG. 12 shows an example of a change in the envelope of the vertical acceleration in the form of the distance between the vehicle and the acceleration sensor.

FIG. 12 shows an example of the change in the envelope of the vertical acceleration in the function of the distance between the vehicle 5 and the acceleration sensor 2. The horizontal axis of FIG. 11, which shows a graph G5, represents the distance between the vehicle 5 that travels along a traffic lane on the floor slab 4*d* and the acceleration sensor 2, and the vertical axis of FIG. 11 represents the amplitude of the envelope of the vertical acceleration.

A waveform W5 shows a change in the envelope of the vertical acceleration in the form of the distance between the vehicle 5 that travels along a traffic lane on the floor slab 4*d* and the acceleration sensor 2. That is, the waveform W5 shows a change in the envelope of the vertical acceleration in the case where the temporal axis of the waveform W4*b* shown in FIG. 11 is converted into a distance axis representing the distance between the vehicle 5 and the acceleration sensor 2.

FIG. 12 shows a change in the envelope in a case where the length of the bridge is "30 m" and the vehicle 5 travels along the travel line L1 (−15 m≤x≤15 m, l=4.6 m). The horizontal axis of FIG. 12, which shows the graph G5, takes values ranging from 15.7 ($\cong(15^2+4.6^2)^{1/2}$), ... 4.6, ... to 15.7 in accordance with Expression (1) (see vertical axis in FIG. 6).

As described above, it can be said that when the vehicle 5 travels on the floor slab 4*d*, the vehicle 5 travels while applying impact to the floor slab 4*d*. The position where the impact is applied to the floor slab 4*d* therefore changes every moment. For example, the position where the impact is applied to the floor slab 4*d* changes with each passing moment along the traffic lanes L1 and L2 shown in FIG. 5. The position where the impact is applied to the floor slab 4*d* changes at a fixed rate along the traffic lanes L1 and L2. The reason for this is that the speed of the vehicle 5 calculated by the speed calculation section 22 (travel of vehicle 5 per unit time) is the average speed of the vehicle 5 that travels on the floor slab 4*d*.

It can therefore be said that the waveform W5 of the graph G5 shows the amplitude at the time when the impact applied in a certain position on the traffic lanes L1 and L2 reaches the acceleration sensor 2. In other words, it can be said that the waveform W5 shows the amplitude of the impact applied in a position separate from the acceleration sensor 2 by a certain distance but measured in the position of the acceleration sensor 2. The attenuation coefficient of the floor slab 4*d* can therefore be determined from the waveform W5. For example, comparison between the waveform W5 and an attenuation model waveform allows determination of the attenuation coefficient of the floor slab 4*d*.

The description of FIG. 4 resumes. The attenuation coefficient calculation section 25 calculates the attenuation coefficient of the floor slab 4*d* on the basis of the envelope of the vertical acceleration produced by the impact and so converted by the conversion section 24 that the envelope changes in the form of the distance.

Figure 13:
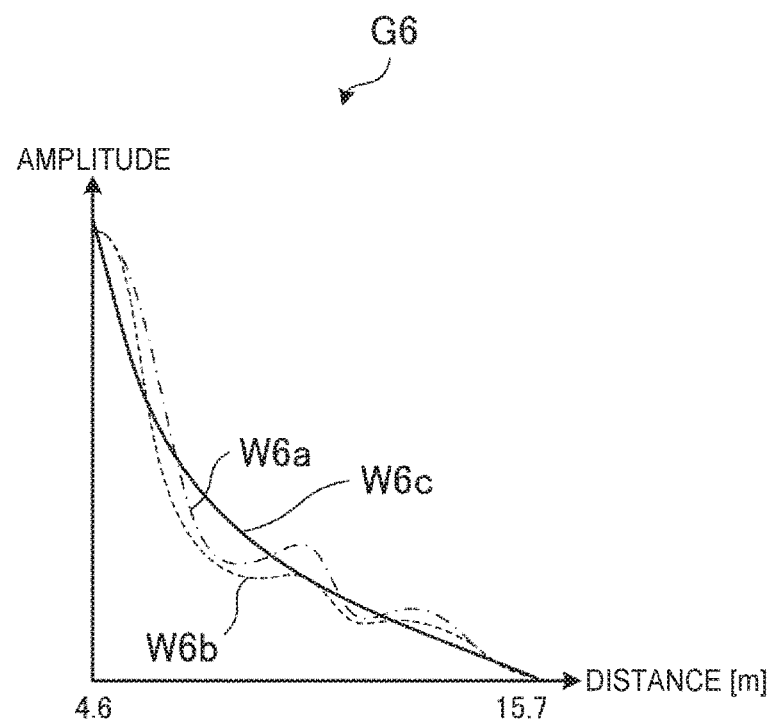
FIG. 13 describes an example of calculation of an attenuation coefficient.

FIG. 13 describes an example of the calculation of the attenuation coefficient. The horizontal axis of FIG. 13, which shows graphs G6, represents the distance between the vehicle 5 that travels on the floor slab 4*d* and the acceleration sensor 2, and the vertical axis of FIG. 13 represents the amplitude of the envelope of the vertical acceleration.

The attenuation coefficient calculation section 25 folds back the envelope of the vertical acceleration produced by the impact and so converted that the envelope changes in the form of the distance at a central portion of the envelope. For example, the attenuation coefficient calculation section 25 folds back the left half of the waveform W5 shown in FIG. 12 at the central portion of the envelope ("distance=4.6," for example). A waveform W6*a* shown in FIG. 13 shows the waveform produced by folding back the left half of the waveform W5 in FIG. 12 at the central portion thereof, and a waveform W6*b* in FIG. 13 shows the right half of the waveform W5 in FIG. 12.

The attenuation coefficient calculation section 25 adjusts (fits) an attenuation model waveform in such away that the adjusted waveform is closest to the waveform of half the envelope of the vertical acceleration converted by the conversion section 24 and the waveform of the other folded-back half. The attenuation model is, for example, expressed by a Bornitz expression and expressed by the following Expression (2).

$$B=\beta e^{\alpha 3} \qquad (2)$$

For example, a waveform W6*c* of the graphs G6 shows the waveform of the Bornitz expression. The attenuation coefficient calculation section 25 adjusts "β" and "α" in Expression (2) in such a way that the waveform W6*c* of the Bornitz expression is closest to the two waveforms W6*a* and W6*b*.

The exponent term "α" in the Bornitz expression represents the attenuation coefficient of a structural body. The attenuation coefficient calculation section 25 can therefore calculate (acquire) the attenuation coefficient of the floor slab 4d from the exponent term "a" of the waveform W6c having been made closest to the two waveforms W6a and W6b.

The attenuation coefficient calculation section 25 may not fold back the envelope of the vertical acceleration due to the impact at the central portion of the envelope. For example, the attenuation coefficient calculation section 25 may fit the waveform of the attenuation model with one of the right and left half of the waveform W5.

In the above description, the horizontal axis of FIG. 13, which shows the graphs G6, represents the distance between the vehicle 5 that travels on the floor slab 4d and the acceleration sensor 2. Instead, the horizontal axis of FIG. 13, which shows the graphs G6, may represent the distance on a traffic lane with the distance from the traffic lane to the acceleration sensor 2 on the floor slab 4d being zero.

The description of FIG. 4 resumes. The estimation section 26 estimates occurrence of abnormality of the floor slab 4d on the basis of the attenuation coefficient of the floor slab 4d calculated by the attenuation coefficient calculation section 25. For example, the estimation section 26 acquires time-series attenuation coefficients of the floor slab 4d calculated by the attenuation coefficient calculation section 25. The estimation section 26 then determines that abnormality of the floor slab 4d occurs when any of the time-series attenuation coefficients changes beyond a predetermined value in a predetermined period.

The estimation section 26, which estimates occurrence of abnormality of the floor slab 4d as described above, can distinguish a change in the attenuation coefficient due to the external environment from a change in the attenuation coefficient due to abnormality of the floor slab 4d, such as cracking. For example, the attenuation coefficient of the floor slab 4d changes in accordance with the temperature, snowfall, rainfall, wind, and other external environments.

On the other hand, assume that an overloaded vehicle 5 passes along the floor slab 4d and damages the floor slab 4d. In this case, any of the time-series attenuation coefficients changes beyond the predetermined value in the predetermined period. When any of the time-series attenuation coefficients changes beyond the predetermined value in the predetermined period, the estimation section 26 estimates that abnormality of the floor slab 4d has occurred. Occurrence of abnormality of the floor slab 4d due, for example, to stress can therefore be appropriately estimated.

The output section 14 outputs a result of abnormality occurrence estimation performed by the estimation section 26 to the display device.

Figure 14:
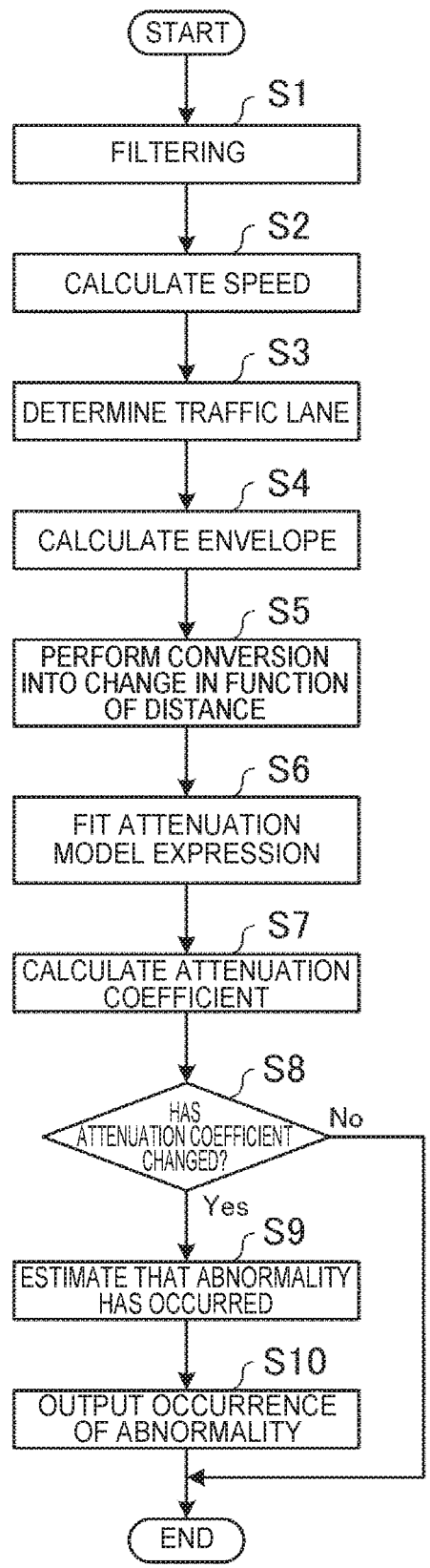
FIG. 14 is a flowchart showing an example of the action of the measurement apparatus.

FIG. 14 is a flowchart showing an example of the action of the measurement apparatus 1. The measurement apparatus 1 carries out the processes in the flowchart of FIG. 14, for example, in a predetermined cycle. It is assumed that the storage section 13 stores the relationship in terms of the distance between the vehicle 5 and the acceleration sensor 2 in both cases where the vehicle 5 travels along the traffic lanes L1 and L2. It is further assumed that the communication section 12 stores the acceleration received from the acceleration sensor 2 in the storage section 13.

The filter section 21 first acquires the acceleration transmitted from the acceleration sensor 2 and stored in the storage section 13 and filters the acquired acceleration (step S1). For example, the filter section 21 uses the LPF to transmit the vertical acceleration and the width-direction acceleration having frequency components due to bending of the floor slab 4d resulting from the load of the vehicle 5. The filter section 21 further uses the BPF to transmit the vertical acceleration having the frequency component due to the impact from the vehicle 5.

The speed calculation section 22 then calculates the passage speed of the vehicle 5 that passes along the floor slab 4d on the basis of the vertical acceleration produced by bending of the floor slab 4d resulting from the load of the vehicle 5 and filtered in step S1 (step S2).

The traffic lane determination section 23 then determines the traffic lane which is provided on the floor slab 4d and along which the vehicle 5 travels on the basis of the width-direction acceleration produced by bending of the floor slab 4d resulting from the load of the vehicle 5 and filtered in step S1 (step S3).

The conversion section 24 then calculates the envelope of the vertical acceleration produced by the impact from the vehicle 5 and filtered in step S1 (step S4). For example, the conversion section 24 calculates the waveform W4b shown in FIG. 11.

The conversion section 24 then uses the speed of the vehicle 5 calculated in step S2 to convert a change in the envelope from the change in the function of time calculated in step S4 into the change in the function of the distance between the vehicle 5 and the acceleration sensor 2 stored in the storage section 13 (step S5). In this process, the conversion section 24 selects the relationship representing the distance between the vehicle 5 and the acceleration sensor 2 and stored in the storage section 13 in the case where the vehicle 5 travels along the traffic lane L1 or L2 on the basis of the traffic lane determined in step S3. The temporal axis of the envelope (waveform W4b in FIG. 11) calculated in step S4 is thus converted into the axis representing the distance between the vehicle 5 and the acceleration sensor 2, as shown by the waveform W5 in FIG. 12.

The attenuation coefficient calculation section 25 then fits the waveform presented by an attenuation model with the envelope of the vertical acceleration produced by the impact and so converted as to be expressed in the axis representing the distance in step S5 (step S6).

The attenuation coefficient calculation section 25 then calculates the attenuation coefficient of the floor slab 4d on the basis of the exponent term in the expression of the attenuation model waveform fit in step S6 (step S7).

The estimation section 26 then evaluates whether or not any of the time-series attenuation coefficients calculated in step S7 has changed beyond a predetermined value in a predetermined period (step S8). When a result of the evaluation shows that any of the time-series attenuation coefficients has changed beyond the predetermined value in the predetermined period ("Yes" in step S8), the estimation section 26 proceeds to the process in step S9. When a result of the evaluation shows that none of the time-series attenuation coefficients has changed beyond the predetermined value in the predetermined period ("No" in step S8), the estimation section 26 terminates the processes in the flowchart.

When a result of the evaluation in step S8 that any of the time-series attenuation coefficients has changed beyond the predetermined value in the predetermined period ("Yes" in step S8), the estimation section 26 estimates that abnormality of the floor slab 4d has occurred (step S9).

The output section 14 then outputs the occurrence of abnormality estimated in step S9 to the display device (step S10). The output section 14 then terminates the processes in the flowchart.

In the flowchart described above, the measurement apparatus 1 carries out the processes in the flowchart of FIG. 14 in a predetermined cycle. The processes in the flowchart of FIG. 14 may instead be carried out when the communication section 12 receive the acceleration from the acceleration sensor 2.

The order of the process in step S2 and the process in step S3 may be reversed.

As described above, the conversion section 24 of the measurement apparatus 1 converts a change in the signal from the acceleration sensor 2 from the change in the form of time into the change in the function of the distance between the vehicle 5 that travels on the floor slab 4d and the acceleration sensor 2. The attenuation coefficient calculation section 25 then calculates the attenuation coefficient of the floor slab 4d on the basis of the signal converted by the conversion section 24 and representing a change in the distance. The measurement apparatus 1 can thus readily obtain the attenuation coefficient of the floor slab 4d from the traveling action of the vehicle 5 on the floor slab 4d.

In the above description, the acceleration sensor 2 is installed on the floor slab 4d, and vibration of the floor slab 4d is detected as the acceleration. Instead, a vibration sensor, a microphone, or any other component may be installed on the floor slab 4d. The measurement apparatus 1 may then calculate the attenuation coefficient of the floor slab 4d from a signal produced by the vibration sensor or the microphone. That is, the measurement apparatus 1 may calculate the attenuation coefficient of the floor slab 4d from an amplitude signal or a sound signal of the vibration that propagates through the floor slab 4d.

Further, the conversion section 24 calculates the envelope of the vertical acceleration due to the impact from the vehicle. The conversion section 24 may instead calculate the envelope of the width-direction acceleration due to the impact from the vehicle. The attenuation coefficient calculation section 25 may then calculate the attenuation coefficient on the basis of the envelope of the width-direction acceleration due to the impact from the vehicle 5. Since the vertical acceleration changes by a greater amount than the width-direction acceleration, the envelope of the vertical acceleration is desirably calculated by the conversion section 24.

The attenuation coefficient calculation section 25 calculates the attenuation coefficient of the floor slab 4d. The attenuation coefficient calculation section 25 may instead calculate an attenuation rate or a logarithmic attenuation rate. The attenuation coefficient calculation section 25 can calculate an attenuation rate $\zeta$ and a logarithmic attenuation rate $\delta$ of the floor slab 4d by using the following expression.

$$\zeta = (-r/\omega)$$

$$\delta = 2\pi\zeta$$

The term "r" in the above expression represents the attenuation coefficient. The term "$\omega$" represents the frequency (40 Hz, for example) of the vertical acceleration produced by the impact and outputted from the filter section 21.

The storage section 13 may store the relationship representing the distance between the vehicle 5 that travels along any of three or more traffic lanes and the acceleration sensor 2. The measurement apparatus 1 can thus calculate the attenuation coefficient even in a case where the floor slab 4d has three or more traffic lanes. In this case, the traffic lane determination section 23 determines which lane the vehicle 5 travels along on the basis of the magnitude of the width-direction acceleration as well as the sign of the width-direction acceleration.

The measurement apparatus 1 may output a result of analysis of the motion of the vehicle 5 that travels on the floor slab 4d as well as the calculated attenuation coefficient to the output section 14. For example, the speed calculation section 22 may output the calculated speed of the vehicle 5 to the output section 14. The speed calculation section 22 may further calculate the weight of the vehicle 5 from the magnitude of the vertical displacement shown in FIG. 8 and output the weight to the output section 14. The traffic lane determination section 23 may output the determined traffic lane along which the vehicle 5 travels to the output section 14.

In the above description, the conversion section 24 uses the relationship representing the distance between the vehicle 5 that travels along a traffic lane and the acceleration sensor 2 provided on the floor slab 4d and stored in the storage section 13 to convert the acceleration outputted from the acceleration sensor 2 in the form of a temporal-axis signal into the acceleration in the form of a distance-axis signal, but not necessarily. For example, in a case where no travel line along which the vehicle 5 travels is known, the conversion section 24 may acquire information on the position of the vehicle 5 from a GPS (inertial navigation system) incorporated in the vehicle 5 and convert the acceleration in the form of the temporal-axis signal into acceleration in the form of a distance-axis signal. Further, in a case where the travel line draws a circular trajectory, the information on the position of the vehicle 5 can be acquired from a rotational azimuth angle. In a case where the trajectory of a moving object is fixed (rail along which roller coaster travels, for example), the information on the position of the moving object can be acquired by use of orbit information. In a case where the position of a moving object is controlled (head of a large printer, for example), the information on the position of the moving object can be acquired from a controller that controls the position of the moving object. The information on the position of a moving object can instead be acquired from an imaging apparatus.

A structural body the attenuation coefficient of which is calculated and a moving object that moves on the structural body are not limited to the bridge 4 and the vehicle 5. The invention is also applicable to a parking lot, an amusement facility, such as a roller coaster, or a large mechanical apparatus, such as a large printer.

Variations

Even before the vehicle 5 enters the floor slab 4d or after the vehicle 5 exits out of the floor slab 4d, the floor slab 4d is accelerated in some cases. For example, when the vehicle 5 approaches the floor slab 4d or moves away therefrom, vibration of the vehicle 5 is transmitted to the floor slab 4d via the bridge pier 4a, the abutment 4d, or the adjacent floor slab 4e in some cases.

In such cases, the acceleration sensor 2 also detects the acceleration of the floor slab 4d produced when the vehicle 5 does not travel thereon. The conversion section 24 cannot therefore appropriately calculate the envelope resulting from the impact from the vehicle 5 of the floor slab 4d. For example, even before the time $t_1$ or after the time $t_2$ shown in FIG. 11, vertical acceleration due to the vibration transmitted through the floor slab 4d is detected. The conversion section 24 therefore undesirably calculates the envelope of the vertical acceleration detected when the vehicle 5 does not travel on the floor slab 4d as the envelope of the vertical acceleration due to the impact from the vehicle 5.

To avoid the situation described above, a detector that detects that the vehicle 5 enters and exits out of the floor slab 4d is installed on the bridge 4. For example, a detector that detects passage of the vehicle 5, such as an infrared sensor, is installed in each of the positions where the vehicle 5 enters and exits out of the floor slab 4*d*.

The conversion section 24 acquires the time when the vehicle 5 has entered the floor slab 4*d* and the time when the vehicle 5 has exited out of the floor slab 4*d* in accordance with the points of times when the detector detects that vehicle 5 has entered and exited out of the floor slab 4*d*. The conversion section 24 then cuts out (extracts) the period from the time when the vehicle 5 has entered the floor slab 4*d* and the time when the vehicle 5 has exited out of the floor slab 4*d* on the basis of the vertical acceleration outputted from the filter section 21. The conversion section 24 can therefore appropriately acquire the vertical acceleration due to the impact from the vehicle 5 that travels on the floor slab 4*d* and appropriately calculate the envelope of the vertical acceleration.

Similarly, the speed calculation section 22 cannot appropriately calculate the speed of the vehicle 5 due to the vibration transmitted through the floor slab 4*d* in some cases. For example, in a case where vertical displacement occurs due to the vibration transmitted through the floor slab 4*d* even before the time $t_1$ and after the time $t_2$ shown in FIG. 8, the speed calculation section 22 cannot appropriately calculate the speed of the vehicle 5 that passes along the floor slab 4*d*.

To avoid the situation described above, the speed calculation section 22 acquires the time when the vehicle 5 has entered the floor slab 4*d* and the time when the vehicle 5 has exited out of the floor slab 4*d* in accordance with the points of times when the detector detects that the vehicle 5 has entered and exited out of the floor slab 4*d*. The speed calculation section 22 can appropriately calculate the speed of the vehicle 5 that travels on the floor slab 4*d* from the acquired entrance time and exit time.

The invention has been described above with reference to the embodiment. It is, however, noted that the functional configurations of the measurement apparatus 1 are classified in accordance with the contents of the primary processes in order to readily understand the configuration of the measurement apparatus 1. How to classify the components or the names of the components do not limit the invention of the present application. The configuration of the measurement apparatus 1 can be further classified into a larger number of components in accordance with the contents of the processes. Further, the classification can be so made that one component carries out a larger number of processes. Moreover, the process carried out by each of the components may be carried out by one piece of hardware or a plurality of pieces of hardware.

The process units in the flowchart described above are divided in accordance with the contents of the primary processes in order to readily understand the processes carried out by the measurement apparatus 1. How to divide the process units or the names of the process units do not limit the invention of the present application. A process carried out by the measurement apparatus 1 can be further divided into a larger number of process units in accordance with the contents of the process. Further, the division can be so made that one process unit contains a larger number of processes.

The technical range of the invention is not limited to the range of the description of the embodiment described above. It is apparent to a person skilled in the art that a variety of changes or improvement can be made to the embodiment described above. It is also apparent from the description of the appended claims that the changed or improved embodiments fall within the technical scope of the invention. The invention can also be provided as an attenuation coefficient calculation method for the measurement apparatus 1, a program that achieves the attenuation coefficient calculation method for the measurement apparatus 1, and a recording medium that stores the program.

The entire disclosure of Japanese Patent Application No. 2015-256335 filed Dec. 28, 2015 is expressly incorporated by reference herein.

What is claimed is:

1. A measurement apparatus for measuring abnormalities in a structural body and performing a structural inspection of the structural body, the measurement apparatus comprising:
    conversion circuitry that receives signal information output from a vibration detector and converts a change in the signal information as provided in a first position on the structural body from a change in the function of time into a change in the function of a distance between a moving object that moves on the structural body and the vibration detector, wherein the signal information indicates an attenuation of a vibration acceleration signal generated by the vibration detector caused by an impact of the moving object, and wherein the attenuation corresponds to a decrease in an amplitude of the vibration acceleration signal as a distance between the vibration detector and the moving object increases;
    attenuation characteristic calculation circuitry that calculates an attenuation coefficient of the attenuation of the vibration acceleration signal through the structural body based on the signal information so converted as to represent the change in the function of the distance, wherein the attenuation characteristic calculation circuitry calculates the attenuation coefficient using amplitudes, as measured by the vibration detector, of the vertical acceleration signal as caused by the impact of the moving object in a plurality of second positions different from the first position;
    estimation circuitry that estimates, for the structural inspection of the structural body, an occurrence of an abnormality of the structural body based on the attenuation coefficient; and
    output circuitry that outputs the occurrence of abnormality.

2. The measurement apparatus according to claim 1, further comprising speed calculation circuitry that calculates a speed of the moving object,
    wherein the conversion circuitry converts a change in the signal information outputted from the vibration detector from the change in the function of time into the change in the function of the distance by using the speed of the moving object.

3. The measurement apparatus according to claim 1, wherein the vibration detector is provided on a side end portion of the structural body, which extends along a restriction direction of a movement direction restrictor that restricts a movement direction of the moving object, and in a central portion of the side end portion in a direction along the restriction direction.

4. The measurement apparatus according to claim 1, wherein the signal information is information on vertical acceleration or width-direction acceleration of a surface of the structural body on which the moving objects travels.

5. The measurement apparatus according to claim 1, wherein the conversion circuitry converts the signal information having a predetermined frequency component and a frequency component due to bending of the structural body resulting from a load of the moving object into the change in the function of the distance, wherein the predetermined frequency component excludes a frequency component due to natural resonance of the structural body.

6. The measurement apparatus according to claim 1, wherein the attenuation characteristic calculation circuitry calculates the attenuation coefficient of the structural body based on information on a distance-dependent waveform of the signal information and information on a waveform that is expressed by an attenuation model of the structural body and attenuates with a distance.

7. The measurement apparatus according to claim 1, wherein the conversion circuitry extracts the signal information produced when the moving object moves on the structural body based on entrance and exit of the moving object into and out of the structural body detected by a detector and converts the signal information into the change in the function of the distance.

8. An attenuation characteristic calculation method for measuring abnormalities in a structural body and performing a structural inspection of the structural body, the method comprising:
converting a change in signal information outputted from a vibration detector provided in a first position on the structural body from the change in the function of time into the change in the function of a distance between a moving object that moves on the structural body and the vibration detector, wherein the signal information indicates an attenuation of a vibration acceleration signal generated by the vibration detector caused by an impact of the moving object, and wherein the attenuation corresponds to a decrease in an amplitude of the vibration acceleration signal as a distance between the vibration detector and the moving object increases;
calculating an attenuation coefficient of the attenuation of the vibration signal through the structural body based on the signal information so converted as to represent the change in the function of the distance, wherein the attenuation coefficient is calculated using amplitudes, as measured by the vibration detector, of the vertical acceleration signal as caused by the impact of the moving object in a plurality of second positions different from the first position;
estimating, for the structural inspection of the structural body, an occurrence of an abnormality of the structural body based on the attenuation coefficient; and
outputting the occurrence of abnormality.

9. A program stored on a non-transitory computer readable storage medium that causes a computer to perform, for measuring abnormalities in a structural body and performing a structural inspection of the structural body:
converting a change in signal information outputted from a vibration detector provided in a first position on the structural body from the change in the function of time into the change in the function of a distance between a moving object that moves on the structural body and the vibration detector, wherein the signal information indicates an attenuation of a vibration acceleration signal generated by the vibration detector caused by an impact of the moving object, and wherein the attenuation corresponds to a decrease in an amplitude of the vibration acceleration signal as a distance between the vibration detector and the moving object increases;
calculating an attenuation coefficient of the attenuation of the vibration acceleration signal through the structural body based on the signal information so converted as to represent the change in the function of the distance, wherein the attenuation coefficient is calculated using amplitudes, as measured by the vibration detector, of the vertical acceleration signal as caused by the impact of the moving object in a plurality of second positions different from the first position;
estimating, for the structural inspection of the structural body, an occurrence of an abnormality of the structural body based on the attenuation coefficient; and
outputting the occurrence of abnormality.

10. A measurement system for measuring abnormalities in a structural body and performing a structural inspection of the structural body, the measurement system comprising:
a vibration detector provided in a first position on the structural body; and
a measurement apparatus including
conversion circuitry that converts a change in signal information outputted from the vibration detector from the change in the function of time into the change in the function of a distance between a moving object that moves on the structural body and the vibration detector, wherein the signal information indicates an attenuation of a vibration acceleration signal generated by the vibration detector caused by an impact of the moving object, and wherein the attenuation corresponds to a decrease in an amplitude of the vibration acceleration signal as a distance between the vibration detector and the moving object increases,
attenuation characteristic calculation circuitry that calculates an attenuation coefficient of the attenuation of the vibration acceleration signal through the structural body based on the signal information so converted as to represent the change in the function of the distance, wherein the attenuation characteristic calculation circuitry calculates the attenuation coefficient using amplitudes, as measured by the vibration detector, of the vertical acceleration signal as caused by the impact of the moving object in a plurality of second positions different from the first position,
estimation circuitry that estimates, for the structural inspection of the structural body, an occurrence of an abnormality of the structural body based on the attenuation coefficient, and
output circuitry that outputs the occurrence of abnormality.

* * * * *